United States Patent
Kuppa et al.

(10) Patent No.: US 11,297,083 B1
(45) Date of Patent: Apr. 5, 2022

(54) IDENTIFYING AND PROTECTING AGAINST AN ATTACK AGAINST AN ANOMALY DETECTOR MACHINE LEARNING CLASSIFIER

(71) Applicant: CA Inc., New York, NY (US)

(72) Inventors: Aditya Kuppa, Dublin (IE); Slawomir Grzonkowski, Dublin (IE)

(73) Assignee: CA, Inc., San Jose, CA (US)

(*) Notice: Subject to any disclaimer, the term of this patent is extended or adjusted under 35 U.S.C. 154(b) by 412 days.

(21) Appl. No.: 16/541,442

(22) Filed: Aug. 15, 2019

(51) Int. Cl.
*H04L 29/06* (2006.01)
*G06N 20/00* (2019.01)
*G06K 9/62* (2022.01)

(52) U.S. Cl.
CPC ........ *H04L 63/1425* (2013.01); *G06K 9/6256* (2013.01); *G06K 9/6267* (2013.01); *G06N 20/00* (2019.01); *H04L 63/145* (2013.01); *H04L 63/1416* (2013.01); *H04L 63/1458* (2013.01)

(58) Field of Classification Search
CPC ............. H04L 63/1425; H04L 63/1416; H04L 63/145; H04L 63/1458; G06N 20/00; G06K 9/6256; G06K 9/6267
See application file for complete search history.

(56) References Cited

U.S. PATENT DOCUMENTS

| | | | | |
|---|---|---|---|---|
| 8,676,729 B1* | 3/2014 | Keralapura | ......... | H04L 63/1416 706/12 |
| 10,733,294 B2* | 8/2020 | Chen | ...................... | G06N 20/10 |
| 2016/0125005 A1* | 5/2016 | Savkli | ................... | G06F 16/904 707/741 |
| 2018/0248903 A1* | 8/2018 | Villella | ................ | G06N 3/0445 |
| 2019/0362196 A1* | 11/2019 | Luan | ........................ | G06N 3/08 |
| 2020/0195683 A1* | 6/2020 | Kuppa | ................ | G06N 3/0472 |
| 2020/0244673 A1* | 7/2020 | Stockdale | ............. | H04L 43/045 |
| 2020/0380308 A1* | 12/2020 | Boedihardjo | ........ | G06K 9/6214 |

(Continued)

OTHER PUBLICATIONS

Kuppa et al.; "Finding Rats in Cats: Detecting Stealthy Attacks using Group Anomaly Detection" Presented in the 18th IEEE International Conference on Trust, Security and Privacy in Computing and Communications (TrustCom 2019), Roturua, New Zealand; May 20, 2019; 8 pages.

(Continued)

*Primary Examiner* — Joseph P Hirl
*Assistant Examiner* — Stephen T Gundry
(74) *Attorney, Agent, or Firm* — Adsero IP

(57) ABSTRACT

Identifying and protecting against an attack against an anomaly detector machine learning classifier (ADMLC). In some embodiments, a method may include identifying training data points in a manifold space for an ADMLC, dividing the manifold space into multiple subspaces, merging each of the training data points into one of the multiple subspaces, training a subclassifier for each of the multiple subspaces to determine a decision boundary for each of the multiple subspaces between normal training data points and anomalous training data points, receiving an input data point into the ADMLC, determining whether the input data point is an attack on the ADMLC due to a threshold number of the subclassifiers classifying the input data point as an anomalous input data point, and, in response to identifying the attack against the ADMLC, protecting against the attack.

20 Claims, 4 Drawing Sheets

(56) References Cited

U.S. PATENT DOCUMENTS

| | | | | |
|---|---|---|---|---|
| 2020/0382536 | A1* | 12/2020 | Dherange | G06F 16/906 |
| 2020/0389478 | A1* | 12/2020 | Abbaszadeh | H04L 63/1475 |
| 2021/0012188 | A1* | 1/2021 | Zhang | G06K 9/627 |
| 2021/0209512 | A1* | 7/2021 | Gaddam | G06N 20/10 |

OTHER PUBLICATIONS

Kuppa et al.; "Enabling Trust in Deep Learning Models: A Digital Forensics Case Study"; Presented in the 17th IEEE International Conference on Trust, Security and Privacy in Computing and Communications (TrustCom 2018), New York, USA; IEEE, 1250-1255. https://doi.org/10.1109/TrustCom/BigDataSE.2018.00172; Aug. 3, 2018; 6 pages.

Al-Dujaili et al.; "Adversarial deep learning for robust detection of binary encoded malware"; Presented in the 2018 IEEE Security and Privacy Workshops (SPW); IEEE; Mar. 25, 2018; 7 pages.

Anderson et al.; "Evading Machine Learning Malware Detection"; Presented in Black Hat USA 2017, Jul. 22-27, 2017, Las Vegas, NV, USA; 6 pages.

Barreno et al.; "Can machine learning be secure?"; Presented in the Proceedings of the 2006 ACM Symposium on Information, computer and communications security, ACM, 2006, Taipei Taiwan; Mar. 21-24, 2006; 10 pages.

Bhagoji et al.; "Practical Black-Box Provable defenses against adversarial examples via the Attacks on Deep Neural Networks Using Efficient Query Mechanisms"; Presented in the European Conference on Computer Vision. Oct. 6, 2018; 16 pages.

Biggio et al.; "Wild Patterns: Ten Years After the Rise of Adversarial Machine Learning" arXiv:1712.03141v2; Jul. 19, 2018; 17 pages.

Bontemps et al.; "Collective Anomaly Detection Based on Long Short-Term Memory Recurrent Neural Networks"; Lecture Notes in Computer Science 10018; Mar. 28, 2017; 12 pages.

Brendel et al.; "Decision-based adversarial attacks: Reliable attacks against black-box machine learning models"; arXiv preprint arXiv:1712.04248; Dec. 12, 2017; 12 pages.

Chalapathy et al.; "Deep Learning for Anomaly Detection: A Survey"; arXiv preprint arXiv:1901.03407; Jan. 9, 2019; 48 pages.

Chandola et al.; "Anomaly detection: A survey"; ACM computing surveys (CSUR); Sep. 2009; 72 pages.

Chandrasekaran et al.; "Model Extraction and Active Learning"; arXiv preprint arXiv:1811.02054; Nov. 7, 2018; 33 pages.

Chawla et al.; "Host based intrusion detection system with combined cnn/rnn model"; In Joint European Conference on Machine Learning and Knowledge Discovery in Databases; Sep. 25, 2018; 10 pages.

Chen et al.; "Zoo: Zeroth order optimization based black-box attacks to deep neural networks without training substitute models"; Presented in the Proceedings of the 10th ACM Workshop on Artificial Intelligence and Security; Nov. 2, 2017; 13 pages.

De Paola et al.; "Malware Detection through Low-level Features and Stacked Denoising Autoencoders" Published in ITASEC 2018; vol. 2058; 10 pages.

Grosse et al.; "Adversarial Perturbations Against Deep Neural Networks for Malware Classification" arXiv preprint arXiv:1606.04435; Jun. 16, 2016; 12 pages.

Hayes et al.; "Learning Universal Adversarial Perturbations with Generative Models"; Presented in the 2018 IEEE Security and Privacy Workshops (SPW); Jan. 5, 2018; 13 pages.

Hodge et al.; "A Survey of Outlier Detection Methodologies"; Artificial Intelligence Review, Oct. 2004, vol. 22, issue 2; Jan. 19, 2004; 43 pages.

Hu et al.; "Generating adversarial malware examples for black-box attacks based on GAN"; arXiv preprint arXiv:1702.05983; Feb. 20, 2017; 7 pages.

Huang et al.; "Adversarial Machine Learning"; Presented in the Proceedings of the 4th ACM Workshop on Security and Artificial Intelligence, Chicago, IL, USA; Oct. 21, 2011; 15 pages.

Ilyas et al.; "Query-Efficient Black-box Adversarial Examples (superceded)"; arXiv preprint arXiv:1712.07113; Apr. 6, 2018; 8 pages.

Javaid et al.; "A Deep Learning Approach for Network Intrusion Detection System"; Presented in the Proceedings of the 9th EAI International Conference on Bio-inspired Information and Communications Technologies (formerly BIONETICS). ICST (Institute for Computer Sciences, Social—Informatics and Telecommunications Engineering); Sep. 14, 2018; 6 pages.

Scipy Developers; "SciPy.org"; website; located at: https://www.scipy.org/index.html; 2019 accessed on Aug. 15, 2019.

Kwon et al.; "A Survey of Deep Learning-Based Network Anomaly Detection"; Published in Cluster Computing; Sep. 2017; 48 pages.

Li et al.; 2014. "Feature Cross-Substitution in Adversarial Classification"; In Advances in Neural Information Processing Systems; 9 pages.

Lin et al.; "IDSGAN: Generative Adversarial Networks for Attack Generation Against Intrusion Detection"; arXiv preprint arXiv:1809.02077; Jun. 16, 2019; 8 pages.

Liu et al.; "Isolation Forest"; Presented in the Proceedings of the 2008 Eighth IEEE International Conference on Data Mining (ICDM '08). IEEE Computer Society, Washington, DC, USA; https://doi.org/10.1109/ICDM.2008.17; Dec. 15-19, 2008; 10 pages.

Liu et al.; "A Survey on Security Threats and Defensive Techniques of Machine Learning: A Data Driven View"; IEEE access, vol. 6; Jan. 6, 2018; 15 pages.

Ma et al.; "Characterizing Adversarial Subspaces Using Local Intrinsic Dimensionality"; arXiv preprint arXiv:1801.02613; Jan. 8, 2018; 15 pages.

Min et al.; "SU-IDS: A Semi-Supervised and Unsupervised framework for network intrusion detection" Presented in the International Conference on Cloud Computing and Security; 2008.

Nelson et al.; "Exploiting Machine Learning to Subvert Your Spam Filter"; Presented at the Proceedings of First USENIX Workshop on Large Scale Exploits and Emergent Threats, Apr. 2008; 9 pages.

Newsome et al.; "Paragraph: Thwarting Signature Learning by Training Maliciously"; Presented in the International Workshop on Recent Advances in Intrusion Detection; Sep. 20-22, 2006; 20 pages.

Thi et al.; "One-Class Collective Anomaly Detection Based on LSTM-RNNs"; Presented at Transactions on Large-Scale Data-and Knowledge-Centered Systems XXXVI, Lecture Notes in Computer Science 10720; 2017; 13 pages.

Papernot et al.; "Transferability in Machine Learning: From Phenomena to Black-Box Attacks Using Adversarial Samples"; arXiv preprint arXiv:1605.07277; 2016; 13 pages.

Papernot et al.; "SoK: Towards the Science of Security and Privacy in Machine Learning"; arXiv preprint arXiv:1611.03814; Nov. 11, 2016; 19 pages.

Papernot et al.; "Distillation as a Defense to Adversarial Perturbations Against Deep Neural Networks" Presented at the 2016 IEEE Symposium on Security and Privacy (SP); IEEE, May 2016; 16 pages.

Pedregosa et al.; "Scikit-learn: Machine learning in Python"; Published in Journal of Machine Learning Research; Oct. 2011; 6 pages.

Pengcheng et al.; "Query-Efficient Black-Box Attack by Active Learning"; Presented in 2018 IEEE International Conference on Data Mining (ICDM); IEEE; 9 pages.

Radford et al.; "Unsupervised Representation Learning with Deep Convolutional Generative Adversarial Networks"; arXiv preprint arXiv:1511.06434; Jan. 7, 2016; 16 pages.

Rivero et al.; "A Grassmannian Approach to Zero-Shot Learning for Network Intrusion Detection" Presented in the International Conference on Neural Information Processing; 11 pages.

Rosenberg et al.; "Generic black-box end-to-end attack against state of the art API call based malware classifiers"; Presented in the International Symposium on Research in Attacks, Intrusions, and Defenses. Jun. 2018; 20 pages.

Roth et al.; "The Odds are Odd: A Statistical Test for Detecting Adversarial Examples"; arXiv preprint arXiv:1902.04818; May 9, 2019; 12 pages.

(56) References Cited

OTHER PUBLICATIONS

Rubinstein et al.; 2009. ANTIDOTE: Understanding and Defending Against Poisoning of Anomaly Detectors; Presented in Proceedings of the 9th ACM SIGCOMM conference on Internet measurement; Nov. 4, 2019; 14 pages.
Ruff et al.; "Deep One-Class Classification"; Presented in the Proceedings of the 35th International Conference on Machine Learning (Proceedings of Machine Learning Research); http://proceedings.mlr.press/v80/ruff18a.html; 2018; 10 pages.
Schlegl et al.; "Unsupervised Anomaly Detection with Generative Adversarial Networks to Guide Marker Discovery"; Presented in the International Conference on Information Processing in Medical Imaging; Mar. 2017; 13 pages.
Schölkopf et al.; "Support Vector Method for Novelty Detection"; Presented at NIPS'99 Proceedings of the 12th International Conference on Neural Information Processing Systems, Denver, CO, USA; Nov. 29-Dec. 4, 1999; 7 pages.
Sewak et al.; "An Investigation of a Deep Learning based Malware Detection System"; Presented in the Proceedings of the 13$^{th}$ International Conference on Availability, Reliability and Security; Sep. 16, 2018; 13 pages.
Shafahi et al.; "Are adversarial examples inevitable?"; arXiv preprint arXiv:1809.02104; Feb. 19, 2019; 17 pages.
Sharafaldin et al.; "Toward Generating a New Intrusion Detection Dataset and Intrusion Traffic Characterization"; Presented in Proceedings of the 4$^{th}$ International Conference on Information Systems Security and Privacy (ICISSP 2018); 9 pages.
Sohi et al.; "Recurrent Neural Networks for Enhancement of Signature-based Network Intrusion Detection Systems"; arXiv preprint arXiv:1807.03212; Jul. 10, 2018; 12 pages.
Suya et al.; "Query-Limited Black-Box Attacks to Classifiers"; arXiv preprint arXiv:1712.08713; Dec. 23, 2017; 5 pages.
Szegedy et al.; "Intriguing Properties of Neural Networks"; arXiv preprint arXiv:1312.6199; Feb. 19, 2014; 10 pages.
Tanay et al.; "A Boundary Tilting Perspective on the Phenomenon of Adversarial Examples"; arXiv preprint arXiv:1608.07690; Aug. 27, 2016; 20 pages.
Tramèr et al.; "The Space of Transferable Adversarial Examples"; arXiv preprint arXiv:1704.03453; May 23, 2017; 15 pages.
Zenati et al.; "Adversarially Learned Anomaly Detection"; Presented in the 2018 IEEE International Conference on Data Mining (ICDM); IEEE; Dec. 6, 2018; 11 pages.
Zhou et al.; "Adversarial Support Vector Machine Learning"; Presented in the Proceedings of the 18th ACM SIGKDD International Conference on Knowledge Discovery and Data Mining, Beijing, China, Aug. 12-16, 2012; 9 pages.
Zhu et al.; "L-BFGS-B—Fortran Subroutines for Large-Scale Bound-Constrained Optimization"; white paper; Dec. 31, 1994, 17 pages.
Zong et al.; "Deep Autoencoding Gaussian Mixture Model for Unsupervised Anomaly Detection" Feb. 15, 2018; 19 pages.
Kolter et al.; "Provable defenses against adversarial examples via the convex outer adversarial polytope"; arXiv preprint arXiv:1711.008511; Jun. 8, 2018; 19 pages.
Weng et al.; "Towards Fast Computation of Ceritifed Robustness for ReLU Networks"; arXiv preprint arXiv:1804.09699; Oct. 2, 2018; 26 pages.
Feinman et al.; Detecting Adversarial Samples from Artifacts; arXiv Preprint arXiv: 1703.00410; Nov. 15, 2017; 9 pages.

\* cited by examiner

United States Patent US 11,297,083 B1

IDENTIFYING AND PROTECTING AGAINST AN ATTACK AGAINST AN ANOMALY DETECTOR MACHINE LEARNING CLASSIFIER

BACKGROUND

Anomaly detectors, also known as outlier detectors, are generally configured to perform unsupervised learning to identify specific observations in a dataset which are rare and significantly deviate from the remaining observations. For example, an anomaly detector may be employed to determine a boundary that separates anomalous data points from normal data points.

Anomaly detectors may be employed in various contexts such as cybersecurity. When thus employed, however, an anomaly detector may be subject to attack by an attacker. For example, an attacker may attack a cybersecurity anomaly detector via a query interface in an attempt to discover the boundary that separates anomalous data points from normal data points. The attacker may then attempt to generate an input data point intended to undermine the anomaly detector by appearing to be a normal data point when in reality it is an anomalous data point. This input data point may then be employed by the attacker to design an attack that will not be detected as such by the cybersecurity anomaly detector. In this manner, the accuracy and effectiveness of an anomaly detector may be undermined by an attacker, resulting in successful attacks that cause damage and loss to computer systems.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for identifying and protecting against an attack against an anomaly detector machine learning classifier (ADMLC) may be performed, at least in part, by a server device including one or more processors. The method may include identifying training data points in a manifold space for an ADMLC executing on the server device, dividing the manifold space into multiple subspaces each defining a sphere, merging each of the training data points into one of the multiple subspaces based on the sphere to which the training data point has the smallest spherelet distance, training a subclassifier for each of the multiple subspaces to determine a decision boundary for each of the multiple subspaces between normal training data points and anomalous training data points, receiving an input data point into the ADMLC, determining whether the input data point is an attack on the ADMLC due to a threshold number of the subclassifiers classifying the input data point as an anomalous input data point, and, in response to identifying the attack against the ADMLC, protecting against the attack by directing performance, at the server device, of a remedial action to protect the ADMLC from the attack.

In some embodiments, the directing performance, at the server device, of the remedial action may include one or more of blocking a network device that was a source of the input data point from accessing the server device over a network, rolling back one or more changes at the server device that were made by the network device, removing the input data point as input to the ADMLC, or some combination thereof.

In some embodiments, the threshold number of the subclassifiers may be equal to all of the subclassifiers. Alternatively, in some embodiments, the threshold number of the subclassifiers may be less than all of the subclassifiers.

In some embodiments, the dividing of the manifold space into multiple subspaces may include using a first tuning parameter that controls the nearest neighbor distance between any two of the training data points, and a second tuning parameter that thresholds a spherical error before assigning a training data point to one of the subspaces.

In some embodiments, the ADMLC may include a cybersecurity ADMLC employed in one or more of intrusion detection, Denial of Service (DoS) attack detection, security log analysis, or malware detection, or some combination thereof.

In some embodiments, the input data point may be intended to undermine the ADMLC by appearing to be a normal data point when in reality it is an anomalous data point.

In some embodiments, one or more non-transitory computer-readable media may include one or more computer-readable instructions that, when executed by one or more processors of a server device, cause the server device to perform a method for identifying and protecting against an attack against an ADMLC.

In some embodiments, a server device may include one or more processors and one or more non-transitory computer-readable media. The one or more non-transitory computer-readable media may include one or more computer-readable instructions that, when executed by the one or more processors, cause the server device to perform a method for identifying and protecting against an attack against an ADMLC.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

An anomaly detector will sometimes employ a machine learning classifier to perform unsupervised learning to learn a boundary that separates anomalous data points from normal data points. When such an anomaly detector is employed in cybersecurity, the anomaly detector may be subject to attack by an attacker. For example, an attacker may attack a cybersecurity anomaly detector machine learning classifier (ADMLC), via a query interface, in an attempt to discover the boundary that separates anomalous data points from normal data points. The attacker may then attempt to generate an input data point intended to undermine the ADMLC by appearing to be a normal data point when in reality it is an anomalous data point. This input data point may then be employed by the attacker to design an attack that will not be detected as such by the cybersecurity ADMLC. In this manner, the accuracy and effectiveness of an ADMLC may be undermined by an attacker, resulting in successful attacks that cause damage and loss to computer systems.

Some embodiments disclosed herein may enable identifying and protecting against an attack against an ADMLC. In some embodiments, a security application may identify training data points in a manifold space for an ADMLC. The security application may then divide the manifold space into multiple subspaces with each subspace defining a sphere. The security application may next merge each of the training data points into one of the multiple subspaces based on the sphere to which the training data point has the smallest spherelet distance. The security application may then train a subclassifier for each of the multiple subspaces to determine a decision boundary for each of the multiple subspaces between normal training data points and anomalous training data points. The security application may next receive an input data point into the ADMLC, such as from an attacker. The security application may then determine whether the input data point is an attack on the ADMLC due to a threshold number of the subclassifiers classifying the input data point as an anomalous input data point. The security application may next, in response to identifying the attack against the ADMLC, protect against the attack by directing performance of a remedial action to protect the ADMLC from the attack.

Therefore, in some embodiments, the methods disclosed herein may successfully detect input data points that were designed by an attacker to undermine a cybersecurity ADMLC by appearing to be a normal data point, when in reality it is an anomalous data point. This successful detection of an anomalous data point that is input by an attacker into the ADMLC may avoid the attacker being able to design an attack that will not be detected as such by the cybersecurity ADMLC. In this manner the, the accuracy and effectiveness of an ADMLC may be protected from an attacker, resulting in protection against attacks that cause damage and loss to computer systems.

Figure 1:
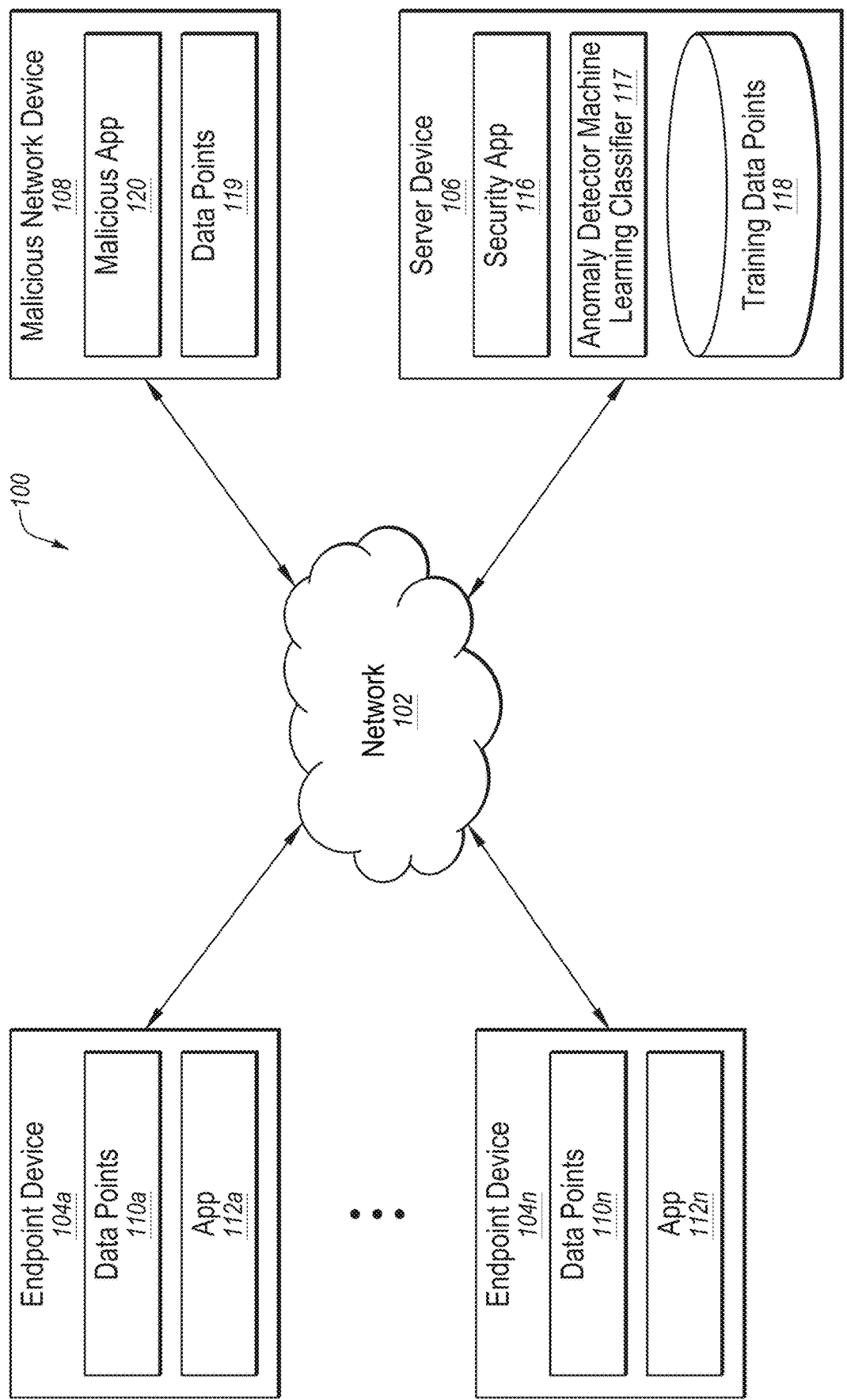
FIG. 1 illustrates an example system configured for identifying and protecting against an attack against an anomaly detector machine learning classifier (ADMLC)

Turning to the figures, FIG. 1 illustrates an example system 100 configured for identifying and protecting against an attack against an ADMLC. The system 100 may include a network 102, endpoint devices 104a-104n, a server device 106, and a malicious network device 108.

In some embodiments, the network 102 may be configured to communicatively couple the endpoint devices 104a-104n, the server device 106, and the malicious network device 108 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
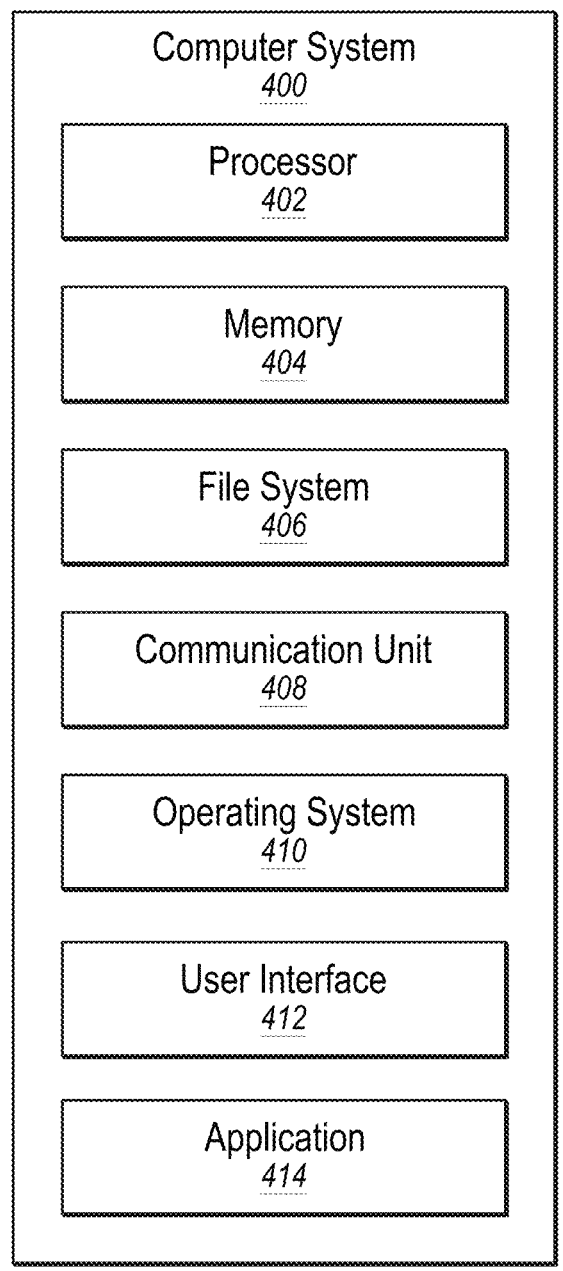
FIG. 4 illustrates an example computer system that may be employed in identifying and protecting against an attack against an ADMLC.

In some embodiments, the malicious network device 108 may be any computer system capable of communicating over the network 102 and capable of executing a malicious app 120, examples of which are disclosed herein in connection with the computer system 400 of FIG. 4. The malicious app 120 may be configured to launch one or more cyberattacks against other network devices, or otherwise attack other network devices. In some embodiments, prior to launching a cyberattack, the malicious app 120 may attack an anomaly detector using data points 119 to attempt to design the cyberattack to avoid detection as a cyberattack, as discussed elsewhere herein. Further, the malicious app 120 may be configured to evolve a cyberattack over time, based at least in part on its attack(s) on the anomaly detector, in an attempt to avoid the cyberattack being detected as a cyberattack.

In some embodiments, each of the endpoint devices 104a-104n may be any computer system capable of communicating over the network 102, examples of which are disclosed herein in connection with the computer system 400 of FIG. 4. The endpoint devices 104a-104n may generate data points 110a-110n. These data points 110a-110n may represent sequences of security events that occur on the endpoint devices 104a-104n and may be used to determine whether events occurring on the endpoint devices 104a-104n are normal (e.g., benign network communications) or anomalous (e.g. a cyberattack launched over the network 102 by the malicious app 120, such as infection by malware in the form of the apps 112a-112n).

In some embodiments, the server device 106 may be any computer system capable of communicating over the network 102 and capable of executing a security app 116, examples of which are disclosed herein in connection with the computer system 400 of FIG. 4. The security app 116 may be configured to implement one or more actions of the methods disclosed herein.

For example, the security app 116 may be configured to identify the data points 110a-110n that occurred over time on the endpoint devices 104a-104n. These data points 110a-110n may then be stored as training data points 118 on the server device 106. The security app 116 may train an anomaly detector machine learning classifier (ADMLC) 117, using the training data points 118, to determine whether any particular data point that is input into the ADMLC 117 is an anomalous data point (e.g. a security event representing a cyberattack launched by the malicious app 120) or a normal data point (e.g., an event representing a benign network communication).

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
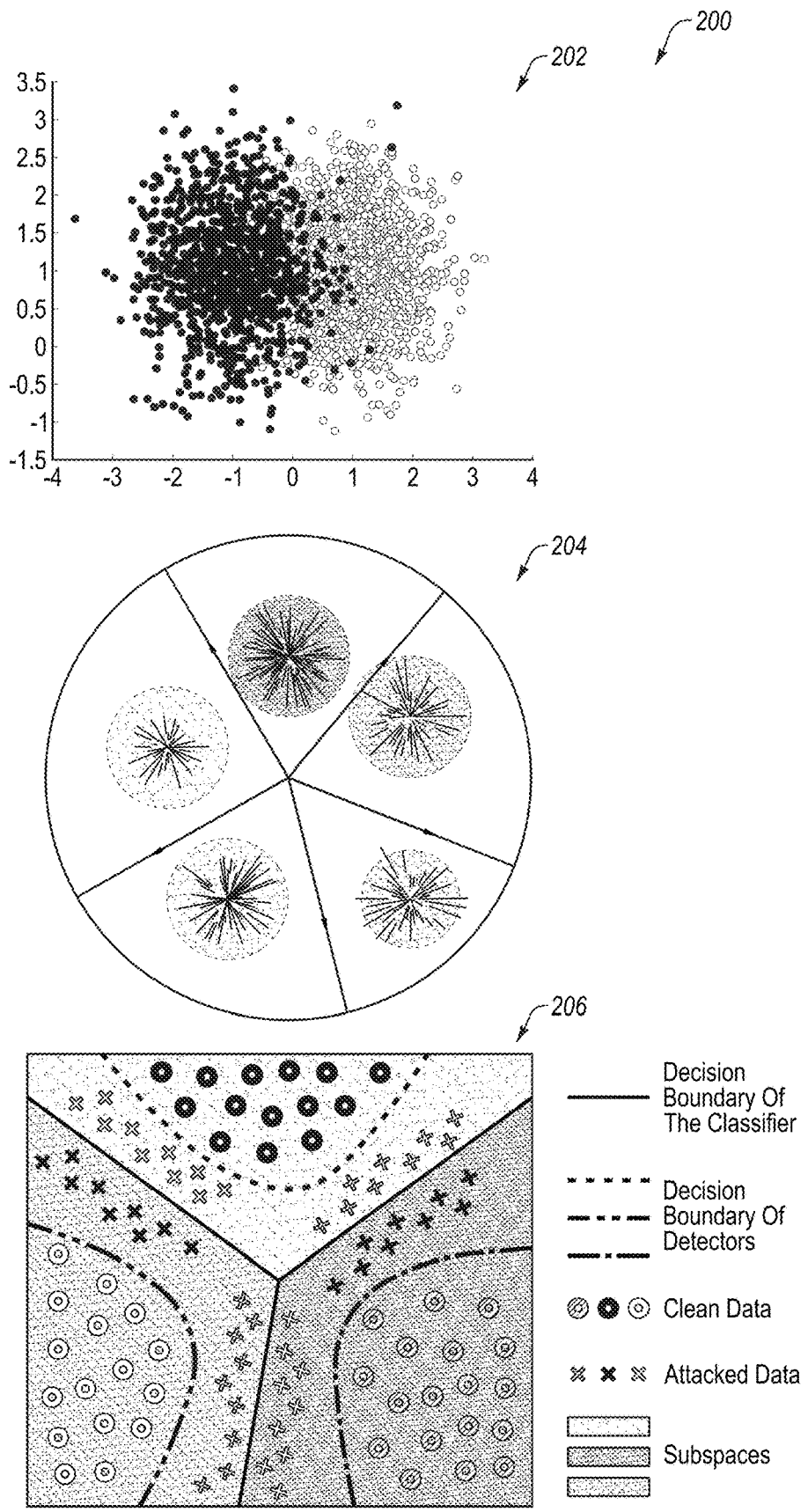
FIG. 2 is a flowchart illustrating aspects of example input data in a scatter plot and then transformed into spherical subspaces by applying a manifold approximation algorithm.

FIG. 2 is a flowchart 200 illustrating aspects of input data in a scatter plot 202 and then transformed into spherical subspaces 204 and 206 by applying a manifold approximation algorithm.

In particular, the flowchart 200 discloses the scatter plot 202 with input data points (e.g., the data points 110a-110n) from several endpoints (e.g., the endpoint devices 104a-104n). The input data points may have overlapping Gaussian distributions and may be plotted in a manifold space. A machine learning classifier (e.g., such as the ADMLC 117 of FIG. 1) may receive the input data points from the scatter plot 202 as input, and the machine learning classifier may then determine a boundary between those input data points that are anomalous data points and those that are normal data points.

The flowchart 200 also discloses the spherical subspaces 204. In the spherical subspaces 204, the scatter plot 202 may have been transformed by applying a manifold approximation algorithm. This may include dividing the manifold space into multiple subspaces with each subspace defining a sphere, and then each of the input data points from the scatter plot 202 may be merged into one of the multiple subspaces based on the sphere to which the training data point has the smallest spherelet distance.

As disclosed in the spherical subspaces 206 (which is a representation of three of the five subspaces shown in the spherical subspaces 204), a subclassifier may be trained for each of the multiple subspaces to determine a decision boundary for each of the multiple subspaces (e.g., the decision boundaries of the detectors) between normal training data points and anomalous training data points. As disclosed in the spherical subspaces 206, the decision boundaries for each of the multiple subspaces may more accurately distinguish between clean data points (e.g., data points that occur naturally) and attack data points (e.g., data points that were designed by an attacker to appear to be normal data points when in reality they are anomalous data points). For example, an attack data point may be specifically designed as an off-manifold input data point with the following properties (a) found in low probability when compared with the data manifold, (b) class distributions differ from their closest data submanifold, (c) proximity to the nearest neighbor adversarial samples with normal samples than to any other neighbor in the training or test set, and (d) the geodesic metric would also be an adversarial Euclidean metric, which may be expressed as, for any two points x and y on a sphere, $d_\infty(x, y) \leq d_2(x, y) \leq d_g(x, y)$, where $d_\infty(x, y)$, $d_2(x, y)$, and $d_g(x, y)$ denote the $l_\infty$, Euclidean, and geodesic distances, respectively. Any off-manifold input data point in the geodesic metric would also be an off-manifold input data point in the $l_\infty$ and Euclidean metrics.

Further, a threshold number of the subclassifiers from the subspaces may be employed to determine whether an input data point is an anomalous input data point. For example, where there are five subspaces and five corresponding subclassifiers (as illustrated in the spherical subspaces 204), the threshold number may be set to five (e.g., all of the subclassifiers), and an input data point may be found to be anomalous only when all five subclassifiers agree that the input data point is anomalous. In another example with the same five subclassifiers, the threshold number may be set to three (e.g., less than all of the five subclassifiers), and an input data point may be found to be anomalous when at least three of the subclassifiers agree that the input data point is anomalous. In this manner, when an input data point is received, the spherical subspaces 204 and 206 (with their more accurate boundaries) may be employed to determine whether the input data point is an attack data point or a normal data point. Where the input data point is an attack data point, a remedial action may be performed to protect the ADMLC from the attack.

Modifications, additions, or omissions may be made to the flowchart 200 without departing from the scope of the present disclosure. In some embodiments, the flowchart 200 may include additional components similar to the components illustrated in FIG. 2 that each may be configured similarly to the components illustrated in FIG. 2.

Figure 3:
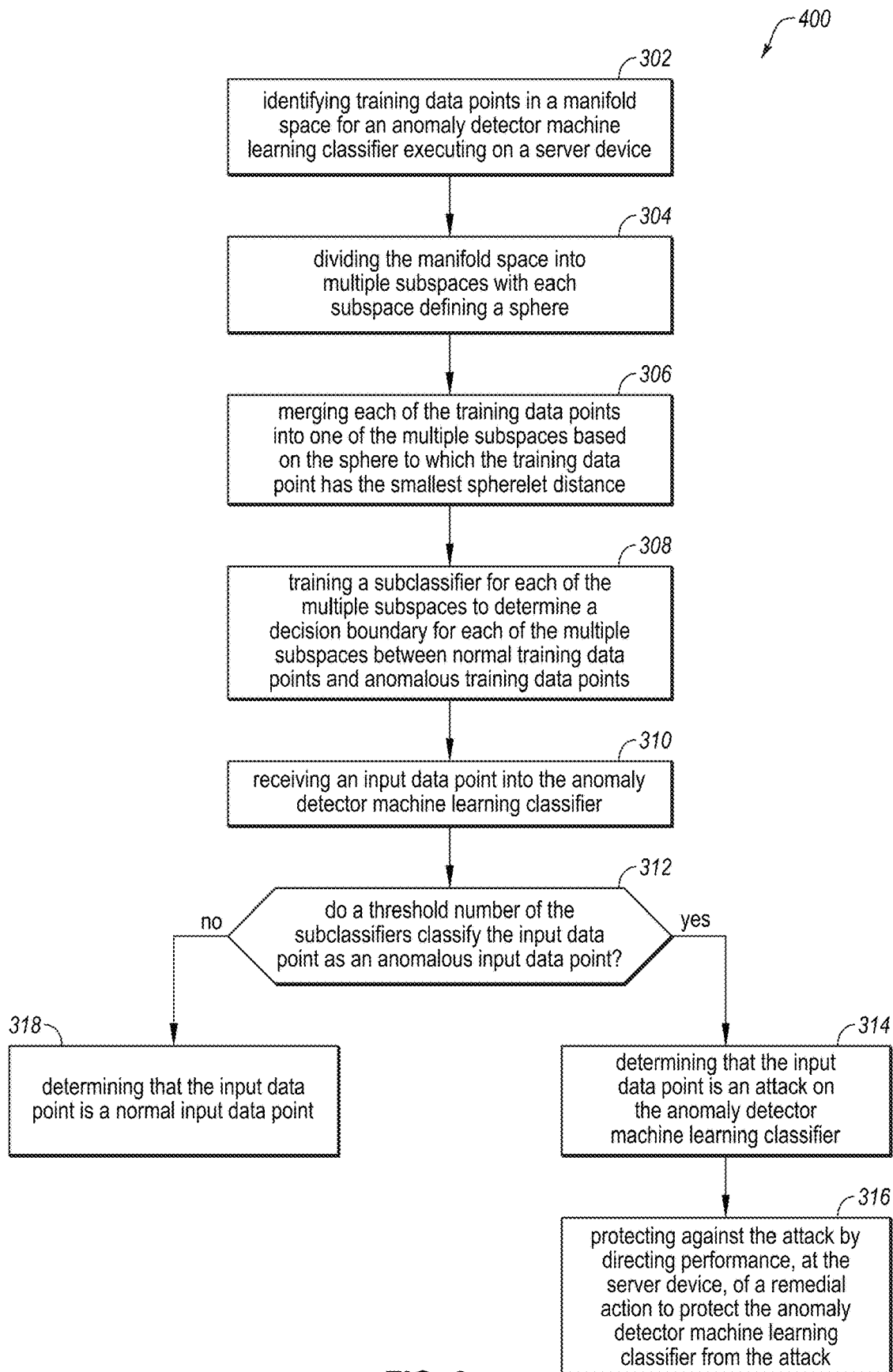
FIG. 3 is a flowchart of an example method for employing identifying and protecting against an attack against an ADMLC.

FIG. 3 is a flowchart of an example method 300 for identifying and protecting against an attack against an ADMLC. The method 300 may be performed, in some embodiments, by one or more applications, devices, or systems, such as by the security app 116 of FIG. 1, or some other app(s) or application(s), or some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, identifying training data points in a manifold space for an ADMLC executing on a server device. In some embodiments, the ADMLC may include a cybersecurity ADMLC employed in one or more of intrusion detection, Denial of Service (DoS) attack detection, security log analysis, or malware detection, or some combination thereof. For example, the security app 116 may identify, at action 302, the data points 110a-110n (that occurred over time at the endpoint devices 104a-104n and that were compiled into the training data points 118) in a manifold space (e.g., the manifold space depicted in the scatter plot 202) for the ADMLC 117 executing on the server device 106. In this example, the ADMLC 117 may be employed in cybersecurity for one or more of intrusion detection, DoS attack detection, security log analysis, or malware detection (e.g., to detect whether the apps 112a-112n are malware sent to the endpoint devices 104a-104n by the malicious app 120), or some combination thereof.

The method 300 may include, at action 304, dividing the manifold space into multiple subspaces with each subspace defining a sphere. In some embodiments, the dividing of the manifold space into multiple subspaces may include using a first tuning parameter that controls the nearest neighbor distance between any two of the training data points, and a second tuning parameter that thresholds a spherical error before assigning a training data point to one of the subspaces. For example, the security app 116 may divide, at action 304, the manifold space (e.g., the manifold space depicted in the scatter plot 202) into multiple subspaces (e.g., the spherical subspaces 204 and 206) with each subspace defining a sphere. This dividing may include using tuning parameters $\lambda$ and $\epsilon$ tuning parameters, where $\lambda$ controls the nearest neighbor distance between data points and $\epsilon$ thresholds the spherical error before assigning a point to a cluster. The use of these two tuning parameters may result in data fitted in each cluster by a cluster-specific sphere.

The method 300 may include, at action 306, merging each of the training data points into one of the multiple subspaces based on the sphere to which the training data point has the smallest spherelet distance. In some embodiments, the spherelet distance between two training data points s(X) and s(Y) may be defined as $d_s = d_R(X,Y) \leq d_E(X,Y) > \lambda$, where $d_E$ is the Euclidean distance between two sets of points, $d_R$ is the Riemannian divergence (geometric) of the dataset of X and Y, and $\lambda > 0$ is a tuning parameter. For example, the security app 116 may merge, at action 306, each of the training data points 118 into one of the multiple subspaces (e.g., the spherical subspaces 204 and 206) based on the sphere to which the training data point has the smallest spherelet distance.

The method 300 may include, at action 308, training a subclassifier for each of the multiple subspaces to determine a decision boundary for each of the multiple subspaces between normal training data points and anomalous training data points. For example, the security app 116 may train, at action 308, a subclassifier for each of the multiple subspaces (e.g., the spherical subspaces 204 and 206) to determine a decision boundary (e.g., the decision boundaries of the detectors) for each of the multiple subspaces between the clean data points and the attack data points.

The method 300 may include, at action 310, receiving an input data point into the ADMLC. In some embodiments, the input data point may be intended to undermine the ADMLC by appearing to be a normal data point when in reality it is an anomalous data point. For example, the security app 116 may receive, at action 310, an input data point from the malicious app 120 chosen from the data points 119, with the input data point intended to undermine the ADMLC 117 by appearing to be a normal data point when in reality it is an anomalous data point.

The method 300 may include, at action 312, determining whether a threshold number of the subclassifiers classify the input data point as an anomalous input data point. If so (yes at action 312), the method 300 may include actions 314 and 316. If not (no at action 312), the method 300 may include action 318. In some embodiments, the threshold number of the subclassifiers may be equal to all of the subclassifiers. Alternatively, in some embodiments, the threshold number of the subclassifiers may be less than all of the subclassifiers. For example, the security app 116 may determine, whether a threshold number of the subclassifiers (e.g., whether all five of the five subclassifiers corresponding to the five spherical subspaces 204) classify the input data point as an attack data point.

The method 300 may include, at action 314, determining that the input data point is an attack on the ADMLC and, at action 316, protecting against the attack by directing performance, at the server device, of a remedial action to protect the ADMLC from the attack. In some embodiments, the directing performance, at the server device, of the remedial action may include one or more of blocking a network device that was a source of the input data point from accessing the server device over a network, rolling back one or more changes at the server device that were made by the network device, removing the input data point as input to the ADMLC, or some combination thereof. For example, the security app 116 may determine, at action 314, that the input data point is an attack on the ADMLC and may protect, at action 316, against the attack by directing performance, at the server device 106, of a remedial action to protect the ADMLC 117 from the attack. In this example, the remedial action may include one or more of blocking the malicious network device 108 (that was the source of the input data point) from accessing the server device 106 over the network 102, rolling back one or more changes at the server device 106 that were made by the malicious network device 108, or removing the input data point as input to the ADMLC 117 (e.g., removing the input data point from the training data points 118), or some combination thereof.

The method 300 may include, at action 318, determining that the input data point is a normal input data point. For example, the security app 116 may determine, at action 314, that the input data point is a clean data point. In this example, the input data point may continue to be used, for example, in the training data points 118, instead of being removed as an attack data point.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 302-314 may be performed without performing action 316 and/or action 318 of the method 300. Further, in some embodiments, action 316 may be performed by a network administrator or other entity that is different from the entity or entities performing the other actions of the method 300.

Further, it is understood that the method 300 may improve the functioning of a server device itself or an endpoint device itself, and may improve the technical field of cyberattack identification and remediation. For example, the functioning of the server device 106 may itself be improved by the method 300, by identifying and protecting against an attack launched against the ADMLC 117 of the server device 106. Further, by identifying and protecting against an attack against the ADMLC 117, the functioning of the endpoint devices 104a-104n may themselves be improved by the method 300, by avoiding the attack against the ADMLC 117 being used to design undetectable cyberattacks launched against the endpoint devices 104a-104n. This identification may be more accurate than was possible using conventional methods due to the identification more accurately detecting input data points that were designed by an attacker to undermine an ADMLC by appearing to be a normal data point when in reality it is an anomalous data point. This more accurate identification of deceptively designed input data points can enable remedial actions to be taken to protect the server device 106, and ultimately to protect the endpoint devices 104a-104n, and their users, from attackers being able to avoid detection and thus access and exploit these devices.

FIG. 4 illustrates an example computer system 400 that may be employed in identifying and protecting against an attack against an ADMLC. In some embodiments, the computer system 400 may be part of any of the systems or devices described in this disclosure. For example, the computer system 400 may be part of any of the endpoint devices 104a-104n, the server device 106, or the malicious network device 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIG. 3. These computer-executable instructions may be included, for example, in the operating system 410, in one or more applications, such as in any of the apps 112a-112n, the security app 116, or the malicious app 120 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIG. 3. In some embodiments, the application 414 (e.g., app) may be part of the operating system 410 or may be part of an application of the computer system 400, or may be some combination thereof. In some embodiments, the application 414 may function as any of the apps 112a-112n, the security app 116, or the malicious app 120 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against an attack against an anomaly detector machine learning classifier (ADMLC), at least a portion of the method being performed by a server device comprising one or more processors, the method comprising:
   identifying training data points in a manifold space for the ADMLC executing on the server device;
   dividing the manifold space into multiple subspaces each defining a sphere;
   merging each of the training data points into one of the multiple subspaces based on the sphere to which the training data point has the smallest spherelet distance;
   training a subclassifier for each of the multiple subspaces to determine a decision boundary for each of the multiple subspaces between normal training data points and anomalous training data points;
   receiving an input data point into the ADMLC;
   determining whether the input data point is an attack on the ADMLC due to a threshold number of the subclassifiers classifying the input data point as an anomalous input data point; and
   in response to identifying the attack against the ADMLC, protecting against the attack by directing performance, at the server device, of a remedial action to protect the ADMLC from the attack.

2. The method of claim 1, wherein the directing performance, at the server device, of the remedial action comprises one or more of blocking a network device that was a source of the input data point from accessing the server device over a network, rolling back one or more changes at the server device that were made by the network device, removing the input data point as input to the ADMLC, or some combination thereof.

3. The method of claim 1, wherein the threshold number of the subclassifiers is equal to all of the subclassifiers.

4. The method of claim 1, wherein the threshold number of the subclassifiers is less than all of the subclassifiers.

5. The method of claim 1, wherein the dividing of the manifold space into the multiple subspaces comprises using:
   a first tuning parameter that controls the nearest neighbor distance between any two of the training data points; and
   a second tuning parameter that thresholds a spherical error before assigning one of the training data points to one of the subspaces.

6. The method of claim 1, wherein the ADMLC comprises a cybersecurity ADMLC employed in one or more of intrusion detection, Denial of Service (DoS) attack detection, security log analysis, or malware detection, or some combination thereof.

7. The method of claim 1, wherein the input data point is intended to undermine the ADMLC by appearing to be a normal data point when in reality it is an anomalous data point.

8. One or more non-transitory computer-readable media comprising one or more computer-readable instructions that, when executed by one or more processors of a server device, cause the server device to perform a method for identifying and protecting against an attack against an anomaly detector machine learning classifier (ADMLC), the method comprising:
   identifying training data points in a manifold space for the ADMLC executing on the server device;
   dividing the manifold space into multiple subspaces each defining a sphere;
   merging each of the training data points into one of the multiple subspaces based on the sphere to which the training data point has the smallest spherelet distance;
   training a subclassifier for each of the multiple subspaces to determine a decision boundary for each of the multiple subspaces between normal training data points and anomalous training data points;
   receiving an input data point into the ADMLC;

determining whether the input data point is an attack on the ADMLC due to a threshold number of the subclassifiers classifying the input data point as an anomalous input data point; and in response to identifying the attack against the ADMLC, protecting against the attack by directing performance, at the server device, of a remedial action to protect the ADMLC from the attack.

9. The one or more non-transitory computer-readable media of claim 8, wherein the directing performance, at the server device, of the remedial action comprises one or more of blocking a network device that was a source of the input data point from accessing the server device over a network, rolling back one or more changes at the server device that were made by the network device, removing the input data point as input to the ADMLC, or some combination thereof.

10. The one or more non-transitory computer-readable media of claim 8, wherein the threshold number of the subclassifiers is equal to all of the subclassifiers.

11. The one or more non-transitory computer-readable media of claim 8, wherein the threshold number of the subclassifiers is less than all of the subclassifiers.

12. The one or more non-transitory computer-readable media of claim 8, wherein the dividing of the manifold space into the multiple subspaces comprises using:
a first tuning parameter that controls the nearest neighbor distance between any two of the training data points; and
a second tuning parameter that thresholds a spherical error before assigning one of the training data points to one of the subspaces.

13. The one or more non-transitory computer-readable media of claim 8, wherein the ADMLC comprises a cybersecurity ADMLC employed in one or more of intrusion detection, Denial of Service (DoS) attack detection, security log analysis, or malware detection, or some combination thereof.

14. The one or more non-transitory computer-readable media of claim 8, wherein the input data point is intended to undermine the ADMLC by appearing to be a normal data point when in reality it is an anomalous data point.

15. A server device comprising:
one or more processors; and
one or more non-transitory computer-readable media comprising one or more computer-readable instructions that, when executed by the one or more processors, cause the server device to perform a method for identifying and protecting against an attack against an anomaly detector machine learning classifier (ADMLC), the method comprising:
identifying training data points in a manifold space for the ADMLC executing on the server device;
dividing the manifold space into multiple subspaces each defining a sphere;
merging each of the training data points into one of the multiple subspaces based on the sphere to which the training data point has the smallest spherelet distance;
training a subclassifier for each of the multiple subspaces to determine a decision boundary for each of the multiple subspaces between normal training data points and anomalous training data points;
receiving an input data point into the ADMLC;
determining whether the input data point is an attack on the ADMLC due to a threshold number of the subclassifiers classifying the input data point as an anomalous input data point; and
in response to identifying the attack against the ADMLC, protecting against the attack by directing performance, at the server device, of a remedial action to protect the ADMLC from the attack.

16. The server device of claim 15, wherein the directing performance, at the server device, of the remedial action comprises one or more of blocking a network device that was a source of the input data point from accessing the server device over a network, rolling back one or more changes at the server device that were made by the network device, removing the input data point as input to the ADMLC, or some combination thereof.

17. The server device of claim 15, wherein the threshold number of the subclassifiers is equal to all of the subclassifiers.

18. The server device of claim 15, wherein the dividing of the manifold space into the multiple subspaces comprises using:
a first tuning parameter that controls the nearest neighbor distance between any two of the training data points; and
a second tuning parameter that thresholds a spherical error before assigning one of the training data points to one of the subspaces.

19. The server device of claim 15, wherein the ADMLC comprises a cybersecurity ADMLC employed in one or more of intrusion detection, Denial of Service (DoS) attack detection, security log analysis, or malware detection, or some combination thereof.

20. The server device of claim 15, wherein the input data point is intended to undermine the ADMLC by appearing to be a normal data point when in reality it is an anomalous data point.

* * * * *